(No Model.)
C. ENGERT.
TOBACCO HANGER.
No. 329,301. Patented Oct. 27, 1885.
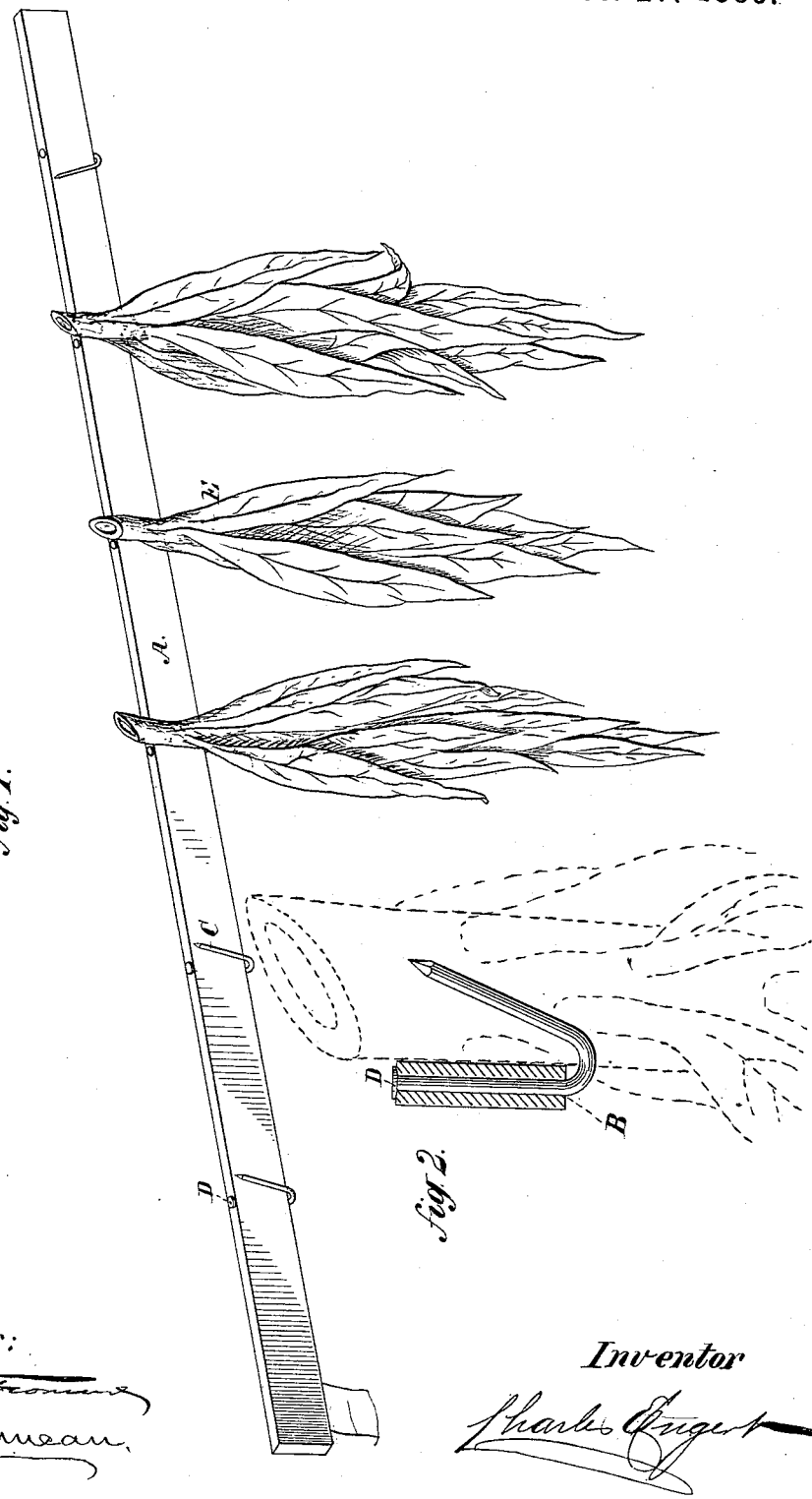

UNITED STATES PATENT OFFICE.

CHARLES ENGERT, OF BROOKLYN, NEW YORK.

TOBACCO-HANGER.

SPECIFICATION forming part of Letters Patent No. 329,301, dated October 27, 1885.

Application filed April 14, 1884. Serial No 127,748. (No model.)

*To all whom it may concern:*

Be it known that I, CHARLES ENGERT, of Brooklyn, in the county of Kings and State of New York, have invented certain new and useful Improvements in Tobacco-Hangers, of which the following is a specification.

My invention relates to devices for holding tobacco-plants properly suspended while they are curing; and it consists in a lath provided with hooks, upon which the plants are to be hung, and which are constructed and arranged in an improved manner, particularly adapting them to this use.

In the drawings, Figure 1 is a perspective view of a lath embodying my improvements, and Fig. 2 is a cross-section of the same on an enlarged scale.

In these views, A represents a wooden lath of any suitable length and size. This lath is pieced from edge to edge at proper intervals along its length by holes B, in which are inserted hooks C. These hooks are provided with flat heads D, which bear upon the upper edge of the lath and prevent the hooks from drawing through the lath, the hooks being free to turn in their holes. The free or point parts of these hooks turn up from the lower edge of the lath, and form with their shank-parts hooks of substantially a V shape, and the length of such free parts is such that their points come below the upper edge of the lath. The green plants are hung upon the hooks, as seen at E, the points of the hooks being forced well into the stalk, but with plants of common size not through them.

The particular advantages of this hanger are these: The plants as fast as cut may be at once hung upon the lath, thus saving any further direct handling of the single plants, and the filled laths can at once be put upon their transporting-racks or hung in the drying-building. This course has an essential gain over the common methods of stringing the plants by spearing, tying, wiring, or otherwise attaching the plants to the lath. In order to prepare the plants for the handling necessary to all such methods, they had first to be left upon the ground as they were cut until wilted, and then, by reason of the inconvenience attending the constant moving of the stringing apparatus, they were gathered together in armfuls and laid in heaps near the stringing apparatus. This of course caused the very tender plants to be squeezed and jammed together, and resulted in their leaves being more or less crushed—a condition that lowers the grade of the cured tobacco; and the repeated handling of the plants also caused a no small loss in the number of leaves that were broken off and torn. The binding devices, too, that were used to fasten the plants to the laths, and the laths themselves when the plants were speared upon them, were the cause of many broken and torn leaves.

The V shape of the hooks is advantageous in that as the weight of the plants drag them down their stalks are forced up snugly against the side of the lath, and the plants are thereby more securely held in their proper places than if they hung freely from the points of the hooks, and so are prevented from swaying and rubbing against one another. This bringing of the plants close to the lath also tends to keep the lath upon its edge when it rests upon the supporting-poles, besides slightly bracing the lath at its weakest points, where it is pierced by the holes for the hooks.

The movable capacity of the hooks, which allows their points to swing around against the side of the lath, is advantageous in that when the hooks are so turned in contact with the side of the lath it is in a more compact and portable form than would be the case if the hooks were fixed in the position in which they are used. So, too, because of this turning capacity, and because of the points of the hooks coming below the upper edge of the lath, when the hooks are down upon the face or side of the lath their points are out of position to endanger the hands of the workmen, nor can they catch into the leaves of the plants as they are being strung, for each hook need not be turned up until it is to be used. It is also to be noticed that it is essential to bend the hooks back toward the face of the lath, so that the bend will come as close to the lower edge of the lath as possible, as shown, in order that the bends of the hooks may not project from the lath and catch the plants; and, further, that the V shape of the hooks is important, because it is the shape that best permits the hooks to lie flat upon the lath.

These laths are produced by simple machinery that bores the holes of a lath at a single operation, and, after the headed wires from which the hooks are made are inserted, bends such wires into hook shape by another single operation.

This machine forms no part of this application, but contributes materially to the cheapness of the lath, which can be produced at a cost not exceeding that of any of the hangers now in common use.

I am aware that hooks have been inserted in wooden bars and held loosely therein; but I am not aware that loose hooks having straight inclined engaging-arms have ever been used in connection with laths in the drying of tobacco, so arranged that the stalk of the tobacco will, by being forced down the incline of the hook, lie flat against the face of the lath, and the preponderance of suspended weight of the tobacco serve to hold the lath edgewise on its supports. This feature—viz., forcing the tobacco-stalks flat against the face of the lath—is accomplished either by the incline of the hook-arm or by turning the hook in its bearings. In any case the hanging leaves by their gravity hold the lath in an edgewise position, allowing thorough ventilation and circulation, and the laths need no other support.

What I claim as new is—

The tobacco-hanger described, consisting of the lath A, having headed spikes fitted loosely in holes therein, and the spikes formed into inclined hook-arms by bending the spikes close to the lower edge of the lath, as shown, whereby the tobacco-stalks being pressed upon the hooks are brought flat against the face of the lath, and the weight of the suspended plants serves to hold the lath edgewise upon its supports, as set forth.

CHARLES ENGERT.

Witnesses:
ISAAC FROMME,
ROBERT H. DUNCAN.